Figure 1:
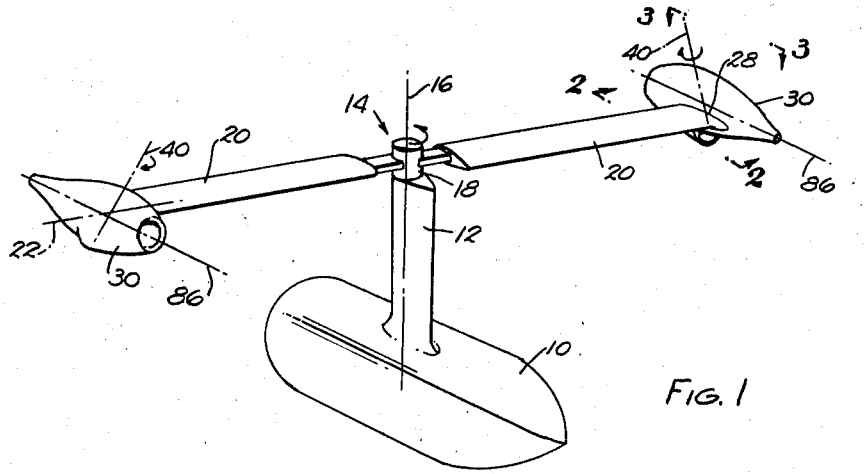

July 15, 1958            R. K. GROVE            2,843,210

ANGLE MOUNTED TIP ENGINE FOR AIRCRAFT SUSTAINING ROTOR

Filed July 28, 1954            2 Sheets-Sheet 1

INVENTOR.
ROBERT K. GROVE
BY
Wilson, Redrow, and Gaines
ATTORNEYS

July 15, 1958 R. K. GROVE 2,843,210
ANGLE MOUNTED TIP ENGINE FOR AIRCRAFT SUSTAINING ROTOR
Filed July 28, 1954 2 Sheets-Sheet 2

INVENTOR.
ROBERT K. GROVE
BY
Wilson, Redrow, and Gaines
ATTORNEYS

United States Patent Office 2,843,210
Patented July 15, 1958

2,843,210

ANGLE MOUNTED TIP ENGINE FOR AIRCRAFT SUSTAINING ROTOR

Robert K. Grove, Grosse Pointe Farms, Mich., assignor to Studebaker-Packard Corporation, a corporation of Michigan Application July 28, 1954, Serial No. 446,269

17 Claims. (Cl. 170—135.4)

The present application relates to engines for aircraft sustaining rotors, for example helicopter rotors, and particularly relates to an angle mounted tip engine of the gas turbine type for driving an aircraft sustaining rotor.

Helicopter sustaining rotor blades which carry their own power shaft propulsion mechanism at their tip end or at an intermediate point on the blade from the center of the blade rotation have been widely discussed throughout recent years and both internally driven and remotely driven blade-mounted propulsion mechanisms have been proposed and are well known. For instance, in the U. S. Patent No. 1,909,450 of the year 1933 a helicopter rotor structure is disclosed in which each of the rotor blades carries its own propulsion propeller and a propeller power shaft therefor mounted to the blade in bearings between the ends of the blade for driving the multi-bladed rotor structure. Both in the noted Patent No. 1,909,450 and in general in its modern day counterparts, the power shaft is substantially transversely disposed to the spanwise axis of the blade and occupies a horizontal plane. In such instances a gyroscopic couple of precession originates in the plane of the blade placing the blade under bending stresses (tension in leading edge and compression in trailing edge or vice versa) resulting from the constantly occurring tumbling action of the power shaft in its horizontal plane of revolution or orbit. Rotor angular rotative rates as high as 845° per second are not considered excessive in present day helicopter work but the resulting tumbling action on a horizontally disposed power shaft axis of the character considered certainly causes concern to be felt on some hands regarding the bending stresses imparted to the rotor blades and regarding the loads to which the power shaft bearings are accordingly subjected. Concern over this situation leads to the desire for a vertically shafted power mechanism arrangement for a helicopter blade, especially in instances of tip-mounted arrangements.

It is in fact an object of the presently disclosed invention in accordance with its basic concept, to provide a vertically shafted power mechanism arrangement for the tip of a helicopter blade wherein the axis of the vertical power shaft inclines slightly forwardly in terms of its translatory direction of orbital motion.

Another object of the invention is the provision of a vertically shafted power mechanism as defined in the preceding object, about which an aerodynamic casing or pod is arranged having air intake and vacuum breaking openings in its opposite longitudinally aligned ends and having a downwardly offset belly opening for the discharge of a jet of exhaust gases in a plane substantially normal to the longitudinal axis of the pod. According to a feature of the invention the downwardly offset discharge jet is directed rearwardly and at slightly downward angles such that its reaction propulsion function results in a slight amount of lift and in a sizable amount of blade twisting moment in the longitudinal vertical plane of the pod. According to another feature of the invention the arrangement of the power shaft direction of rotation and its inclination are such that gyratory forces of precession occur which, in their average value, tend to neutralize the blade twisting moment just noted.

Another object of the invention is the provision of a pod encased jet engine having a downwardly offset belly opening for the jet as defined in the preceding paragraph, but arranged with a sufficient magnitude of downward offset as to leave a finite gap between the jet of propulsive gases and the adjacent portions of the under side of the belly of the pod so as to provide a laminar flow of gas separation or break-away from the belly of the pod at an effective downward angle and free from skin drag on the underside of the pod.

Another object is the provision of an angle mounted tip engine for aircraft sustaining rotors having vertically spaced apart compressor and gas turbine members and having one or more U-shaped interconnections, in at least one of which the compressed but unburned motive fluid is converted to energy laden motive fluid composed of combustion products for gas driving the turbine member. According to one feature of the invention the base of the latter U-shaped interconnection between its opposite leg portions comprises burner means disposed in the plane of rotation of the rotor but directing its flow of flame toward the center of rotation of the rotor such that the centrifugal forces due to rotor rotation delay the transit time of the fuel being burned and oppose radially inward the flow thereof so as to insure adequate time for more complete combustion of the combustion products.

Another object of the invention is to provide, for use on an aircraft sustaining rotor, an angle mounted tip engine having vertically spaced apart compressor and turbine members as defined in the preceding object and wherein the turbine member includes fixed hollow stator vanes which are cooled internally by means of a stream of air conducted by a U-shaped conduit which bleeds off compressed air from the compressor member.

Further features, objects and advantages will either be specifically pointed out or become apparent when for a better understanding of the invention reference is made to the following written description taken in conjunction with the accompanying drawings in which:

Figure 1 is a perspective view of the present angle mounted tip engine arrangement for the load sustaining rotor blades of a helicopter.

Figure 2:
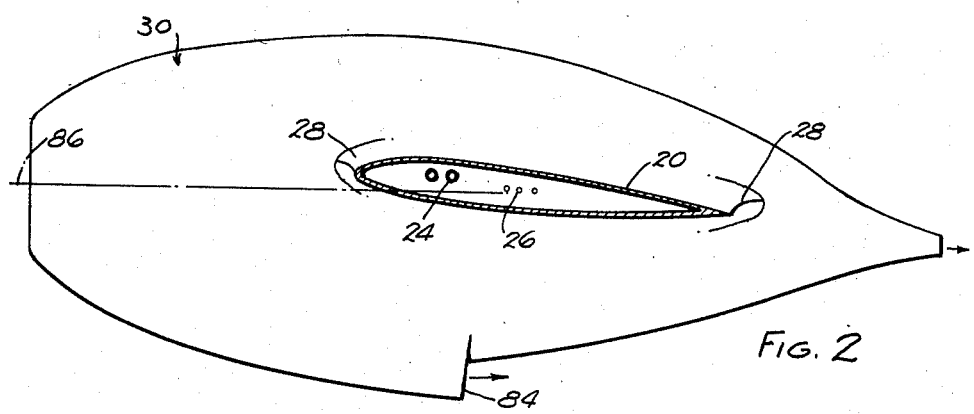
Figure 3:
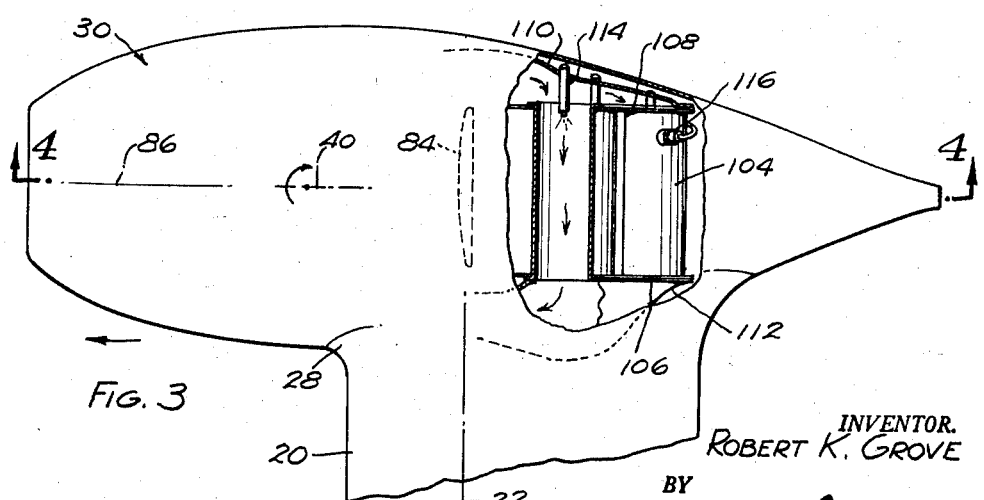

Figures 2 and 3 are side elevation and plan views taken respectively along the lines 2—2 and 3—3 of Figure 1.

Figure 4:
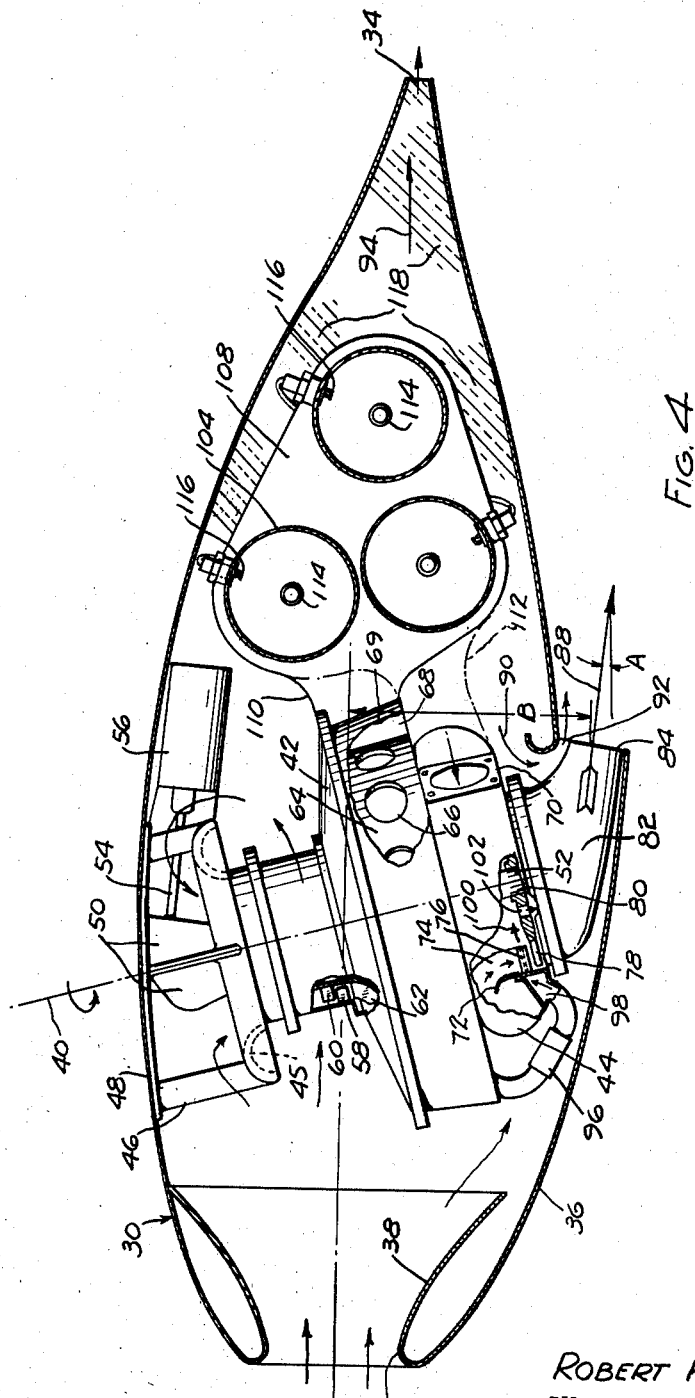

Figure 4 is a longitudinal sectional view in side elevation taken along the lines 4—4 of Figure 3.

In the drawings, particularly Figure 1, a helicopter is shown as illustrative of one type of sustaining rotor aircraft presently contemplated, the helicopter having a fuselage 10, an upwardly extending bearing containing mast 12, and a rotor assembly 14 having a central shaft set in the bearings contained in the mast 12 for rotation about a substantially vertical axis 16. The rotor assembly 14 has a central hub 18 to which a plurality of blades 20, two in number as shown, are attached at their inner ends to rotate as load sustaining members in a horizontal plane about the axis 16 as a center. The blades 20 are pivoted in customary fashion at their inner ends for independently adjustable angles of attack for varying the degree of rotor lift and the hub 18 is arranged in a known manner to assume various positions of nutation for purpose of guiding the helicopter. Each of the blades 20 best seen in cross section in Figure 2 has an air foil cross section and along its center or spanwise axis indicated at 22 is provided with a plurality of control pipes or conduits such as at 24 and fuel and oil pipes such as at 26. Integrally secured to the tip of each blade 20 as by means of a flared section 28, a pod-encased vertically shafted gas turbine jet engine 30 is provided. The encasing pod or shell for the gas turbine jet engine 30 includes a pair of substantially axially aligned air intake and vacuum breaking openings 32, 34 which in the orbital path of movement of the gas turbine jet engine 30 are substantially axially aligned. The shell or pod has a thin sheet metal exterior 36 which at the intake opening 32 for ram air is reversely bent on itself to define a smooth walled venturi portion 38. The vertically shafted gas turbine jet engine 30 is arranged such that the principal rotating components thereof rotate about the substantially vertical axis 40 and, as viewed in Figure 1 particularly, this machinery preferably has a clockwise direction of rotation which is contra-directional with respect to the counterclockwise direction of rotation of the rotor and hub assembly 18 about the central axis 16. The choice of this contra-rotational effect is for purposes of adding to the blade stability of the blades 20 with regard to flapping (that is to say, oscillations in the instantaneous vertical plane of the blade axis 22) and in order to offset certain thrust couples inhering in the dynamics of the operation of the helicopter.

In Figure 4, the principal pieces of rotating machinery in the engine 30 include a pair of vertically spaced apart compressor and gas turbine components 42, 44 respectively. The compressor component 42 receives ram air through an upwardly open bell mouth 45 which is in continual communication with the ram air opening 32 in the forward end of the pod shell 36. A set of four thin walled struts 46 spaced at 90° from one another suspends the bell mouth 45 from the overhead or top side of the pod shell 36 through a suitable inside reinforcing plate 48 to which the struts are welded at their upper end. Secured at a point within the four struts 46 and held in the top of the pod shell, there is provided a bevel gear case 50 having one of its two meshed bevel gears directly connected to a main gas turbine power shaft 52 defining the noted vertical axis of rotation 40. Another of the two bevel gears, not shown, within the bevel gear case 50 is connected to an accessory shaft 54 and the main shaft 52 and the accessory shaft 54 are thus interconnected through the bevel gears. The accessory shaft 54 is substantially horizontally disposed and is connected to certain rotating mechanism in an accessory case 56 which includes a set of fuel regulating valves, an oil circulating pump, and a gas turbine starter, not shown. The fresh air inducted through the shell inlet opening 32 and the bell mouth 45 is led into the compressor component 42 where it passes through one or more stages of stator vanes and diffuser vanes 58 and at least two stages of rotor vanes 60 and 62. The rotor vanes 60 in the compressor component 42 are of the axial flow type and rotor vanes 62 in the compressor component 42 are of the centrifugal or radial flow type which cooperate to unusual advantage with the axial flow blades 60. The radial flow vanes or blades 62 rotate within a circumferential inner housing 64 formed with a circumferential row of radially outwardly open ports 66 communicating with a peripheral collecting chamber or compressed air ring 68 surrounded by a circumferential outer housing 69. The compressed air ring or collecting chamber 68 is arranged for the tangential discharge of pressurized air therefrom in a manner hereinafter discussed more fully in detail. The gas turbine component 44 has a peripheral scroll or motive fluid inlet ring which is supplied by means of a flanged tangential inlet 70 in a manner also more fully described hereinafter.

The motive fluid inlet ring in the turbine component 44 is of U-shape in cross section and is provided with an internal disc 72 which cooperates with the inner periphery of the inlet ring to define an axial gas flow passage 74. One or more sets of stator and rotor blades 76, 78 are provided within the turbine component and the latter blades 78 are secured to a turbine wheel splined at 80 to the main or power shaft 52 which is splined to and drives the compressor rotor vanes or blades 60 and 62. The gas turbine component 44 has a tapering discharge exhaust collector 82 which terminates in a substantially rectangular opening 84 in a plane transverse to the longitudinal axis of the pod shell indicated at 86.

The horizontal disposition shown for the axis 86 corresponds to a horizontal position of the tip of the adjacent blade 20. Correspondingly the angle of jet discharge through the opening 84 has an axis 88 which preferably forms an angle A to the horizontal.

The following is given as an example of the angles of attack of the blade (corresponding to the axis 86) and the corresponding angles of the main power shaft 40, where a zero angle of attack forms an angle of zero degrees with the horizontal and where under such circumstances the downward and rearward angle of discharge A of the jet is approximately 7.5°:

Minimum angle of attack: 4°
Maximum angle of attack: 19°
Minimum angle of the axis 40 to the vertical: 4°
Maximum angle of the axis 40 to the vertical: 19° where the axis 40 is at all times in the longitudinal vertical plane containing the pod axis 86.

A portion of the ram air within the pod shell 36 is conducted as indicated by an arrow 90 through a gap 92 in a pod belly opening formed as a result of the downward offset of the discharge mouth of the exhaust collector 82 with respect to the pod belly opening and to the underside of the after belly portion of the pod shell 36. The resulting gap at 92 may be of the order of one or two inches for a normally sized helicopter and serves to break away the jet discharge from the under belly of the pod shell 36 in laminar flow along the axis 88. Another portion of the ram air is led rearwardly in the direction of an arrow 94 and discharged through the opening 34 at the rear of the pod shell 36 so as to break up any vacuum or turbulence forming tendencies of the air stream in flowing along the after portions of the pod shell 36. A portion of the compressed air from the collector ring 68 is bled through a U-shaped conduit 96 into a fresh air cooling chamber 98 formed at one side of the motive fluid inlet chamber for the turbine component 44. The vanes 76 of the turbine stator are preferably hollow in the spanwise direction so as to receive the compressed cooling air internally thereof from the chamber 98 and discharge such air radially inwardly in the direction of an arrow 100 so as to be led through an axial opening 102 in the wheel for the turbine rotor blades 78 and introduced into the exhaust collector casing 82. The main portion, however, of compressed air from the collector ring 68 is fed into a U-shaped conduit of composite structure best illustrated in Figure 3 of which the base of the U comprises a set of tubular fuel burner elements or cans 104 disposed side by side. The burners 104 are mounted at their opposite ends in a pair of spaced apart tube header sheets 106, 108 and are preferably three in number. The leg portions of the U-shaped conduit are seen at 110 and 112 respectively and the outermost upper leg portion 110 is tangentially connected to the compressed air collector chamber 68 for the compressor on the side away from the viewer viewing Figure 4. The other lower leg portion 112 is tangentially connected to the flanged tangential inlet 70 on the side of the turbine component near the viewer viewing Figure 4. Compressed fresh air leaving the cooling ring 68 of the two stage air compressor component 42 is led through the leg portion 110 of the U-shaped conduit and through the openings formed in the tube sheet 108 at the points at which the tubular burners 104 are received. Adjacent each just noted opening a fuel spray nozzle 114 is centrally located and at a nearby position in the side of each burner tube a spark igniter 116 is located. Fuel sprayed by the nozzles 114 and ignited by the spark igniters 116 burns in the compressed air atmosphere of the three burners 104 which are mechanically in parallel to one another and the products of combustion are conducted through the leg portion 112 of the U-shaped conduit and fed tangentially into the inlet scroll of the gas turbine component 44. Inasmuch as the centrifugal forces effective on the gas turbine unit 30 as seen on the paper showing of Figure 3 are directed upwardly of the paper the fuel particles delivered by the nozzles 114 in order to move downwardly of the paper must overcome the outward sling of the centrifugal forces involved and are thereby slowed down in their transit from the nozzle 114 to the opposite end of each tubular burner 104. More complete combustion accordingly tends to take place than in burners mounted otherwise and particularly so in the case of the heavier less well atomized fuel droplets.

Many of the voids within the shell pod 36 in its after portions may be filled with a body of fluid pervious sound deadening insulation material schematically appearing at 118. It will be noted from the paper showing of Figure 4 that the axis 88 of the center or core of discharge of the exhaust jet from the belly of the pod shell 36 is offset by a distance B in vertical spacing below the central axis 86 of the shell pod 36. The resulting offset tends to induce a twisting moment in the tip of each blade 20 which at the average speed of an average helicopter produces clockwise a moment of approximately 550 foot pounds in the plane of the paper. For such average conditions, the gyroscopic forces of precession caused by the noted acute angle of tilt of the rotating power shaft 40 from the vertical will introduce an opposite couple or moment under theories more fully set out for instance at pages 224–225 of Marks' Mechanical Engineers Hand Book, McGraw-Hill, 1941. The following is given as an example of the magnitude of the gyroscopic couples of precession occasioned by the slight angularity of the axis 40 with respect to the vertical.

Angularity of 4° from vertical: 260 foot pounds.
Angularity of 19° from vertical: 830 foot pounds.

It thus becomes apparent that the mean or average angle of tilt of the axis 40 in terms of moment produced equals approximately the blade twisting moment of the offset jet thrust and thus it is desirable to have the vertically arranged shaft 80 inclined to the vertical at an angle of greater than 4° and less than 19° over the average.

As herein disclosed, the present engine invention is shown embodied in a tip mounted rotor blade arrangement wherein the engine and rotor blade shafts are contra-rotative to one another and are both in a substantially vertical disposition with the engine shaft axis being inclined slightly forwardly with respect to its forward motion of orbital translation. It is evident that the engine shaft may be in some cases more nearly or actually vertical or else tilted rearwardly with respect to its direction of motion and especially the latter where the engine has an overhead jet discharge rather than a belly discharge arrangement in which case it is self-evident that a negative instead of a positive blade twisting moment arises due to the upward off-set of the jet blast. So also the drawing shows a bi-motored helicopter having a two bladed rotor but it is not essential that the rotor have as many as or only two blades and any convenient number of blades may be used of which each blade may have one or more spaced apart engines in the spanwise direction of the blade. The rear end portion of the pod shell 36 incorporates a vacuum breaking opening 34 for delivering a minor trailing stream of ram air in order to encourage and produce a laminar wake of air flow behind the moving pod, but indeed the trailing stream is not necessarily essential to the invention and in some instances the vacuum breaking opening may be omitted and the rear end portion of the shell be simply formed solid and closed off.

Variations within the spirit and scope of the invention disclosed are equally comprehended by the foregoing description.

What is claimed is:

1. An aircraft propulsion mechanism comprising a propelling blade serving as a load sustaining member and rotatable in one angular direction in a horizontal plane, a tip mounted aerodynamic pod secured to the blade for movement therewith and defining front and rear openings in substantial alignment in their paths of motion with respect to one another, a gas turbine unit mounted between said openings within said pod and having vertically spaced apart compressor and turbine rotors provided with a common power shaft, said unit having an exhaust stack discharging in a jet opening in the bottom of the pod and in a direction rearwardly and slightly downwardly so as to produce a translatory thrust having a positive blade twisting moment viewed from a reference point, said power shaft having a direction of rotation opposite to said one angular direction with the axis thereof normally inclining forwardly in the longitudinal vertical plane of the pod at an angle in excess of approximately 4° from the vertical so as to produce a gyroscopic blade twisting couple of precession of negative moment as viewed from said reference point.

2. An aircraft propulsion mechanism comprising a propelling blade serving as a load sustaining member and rotatable in a horizontal plane, a tip mounted aerodynamic pod secured to the blade for movement therewith and defining a front air inlet opening and rear drag relieving opening in substantial alignment in their paths of motion with respect to one another, and a gas turbine unit in communication with the front air inlet opening and mounted between said openings within said pod, said gas turbine unit having vertically spaced apart compressor and turbine rotors provided with a common power shaft and further having an exhaust stack discharging in a jet opening in the bottom of the pod and in a direction rearwardly and slightly downwardly so as to produce a translatory thrust having a positive blade twisting moment viewed from a reference point, said power shaft having the axis thereof normally inclining forwardly in the longitudinal vertical plane of the pod at a mean angle of approximately one-half the sum of 4° and 19° so as to produce a gyroscopic blade twisting couple of precession of negative moment as viewed from said reference point.

3. An aircraft propulsion mechanism comprising a propelling blade serving as a load sustaining member and rotatable in one angular direction in a horizontal plane, a tip mounted aerodynamic pod secured to the blade for movement therewith and defining a front opening substantially concentrically aligned with its path of motion, a gas turbine unit mounted within said pod and having vertically spaced apart compressor and turbine rotors provided with a common power shaft, said unit having an exhaust stack discharging in a jet opening in the bottom of the pod and in a direction rearwardly and slightly downwardly so as to produce a translatory thrust having a positive blade twisting moment viewed from a reference point, said power shaft having a direction of rotation opposite to said one angular direction with the axis thereof inclining forwardly in the longitudinal vertical plane of the pod at an angle less than approximately 19° from the vertical so as to produce a gyroscopic blade twisting couple of precession of negative moment as viewed from said reference point.

4. An aircraft propulsion mechanism comprising a propelling blade serving as a load sustaining member and rotatable in a horizontal plane, a tip mounted aerodynamic pod secured to the blade for movement therewith and having front and rear portions in substantial alignment in their paths of motion with respect to one another, with the front portion defining an air inlet, a gas turbine unit mounted between said portions within said pod so as to communicate with said air inlet and having vertically spaced apart compressor and turbine rotors provided with a common power shaft, said unit having an exhaust stack discharging in a jet opening in the bottom of the pod and in a direction rearwardly and slightly downwardly so as to produce a translatory thrust having a positive blade twisting moment viewed from a reference point, said power shaft having the axis thereof inclining in the longitudinal vertical plane of the pod at an angle between approximately 4° and 19° from the vertical so as to produce a gyroscopic blade twisting couple of precession of negative moment as viewed from said reference point.

5. An aircraft propulsion mechanism comprising a propelling blade serving as a load sustaining member and rotatable in one angular direction in a horizontal plane, a tip mounted aerodynamic pod secured to the blade for movement therewith and having front and rear portions in substantial alignment in their paths of motion with respect to one another with the front portion defining an air inlet opening, a gas turbine mounted internally of said pod between said front and rear portions thereof so as to receive air from the inlet air opening and having vertically spaced apart compressor and turbine rotors provided with a common power shaft, said gas turbine having an exhaust stack discharging in a jet opening in the bottom of the pod and in a direction rearwardly and slightly downwardly so as to create a translatory thrust productive of a blade twisting moment of one direction, said power shaft having a direction of rotation opposite to said one angular direction and arranged to produce a gyroscopic blade twisting couple of precession in another direction.

6. In an aircraft propulsion mechanism having a propelling blade serving as a load sustaining member and rotatable in one angular direction in a horizontal plane, a tip mounted aerodynamic pod carried by the blade for movement therewith and having front and rear portions in substantial alignment in their path of motion with respect to one another, a gas turbine unit mounted between said portions within said pod and having vertically spaced apart compressor and turbine rotors provided with a common power shaft, said unit having an exhaust stack discharging in a transverse plane through a downwardly offset belly opening in the pod and in a direction slightly downwardly and rearwardly so as to produce a translatory thrust productive of a blade twisting moment of a predetermined average magnitude, said power shaft having a direction of rotation opposite to said one angular direction with the axis thereof inclining forwardly in the longitudinal vertical plane of the pod at an angle less than approximately 19° from the vertical and producing a gyroscopic blade twisting moment of precession of an opposite average magnitude.

7. In an aircraft propulsion mechanism comprising a propelling blade serving as a load sustaining member and rotatable in one angular direction in a horizontal plane, a tip mounted aerodynamic pod mounted on to the blade for movement therewith and having front and rear portions in substantial alignment in their paths of motion with respect to one another with the front portion defining a turbine inlet, a gas turbine unit mounted in said pod between said portions in communication with the inlet and having vertically spaced apart compressor and turbine rotors provided with a common power shaft, said unit having an exhaust stack discharging in a transverse plane through a vertically offset girth opening in the pod and in a general rearward direction so as to produce a translatory thrust having a blade twisting moment of a predetermined average magnitude, said power shaft having a direction of rotation opposite to said one angular direction with the axis thereof inclining in the longitudinal vertical plane of the pod at an acute angle from the vertical and producing a gyroscopic blade twisting moment of precession of an opposite average magnitude.

8. An aircraft propulsion mechanism comprising a propelling blade serving as a load sustaining member and rotatable in one angular direction in a horizontal plane, a tip mounted aerodynamic pod secured to the blade for movement therewith, and a gas turbine unit mounted within said pod and having vertically spaced apart compressor and turbine rotors provided with a common power shaft, said unit having an inlet and an exhaust stack discharging in a transverse plane through a downwardly offset belly opening in the pod and in a direction generally rearwardly so as to produce a translatory thrust having a blade twisting moment of a predetermined average magnitude, said power shaft having a direction of rotation opposite to said one angular direction with the axis thereof inclining forwardly in the longitudinal vertical plane of the pod at an angle less than approximately 19° from the vertical and producing a gyroscopic blade twisting moment of precession of an opposite average magnitude.

9. An aircraft propulsion mechanism comprising a propelling blade serving as a load sustaining member and rotatable in one angular direction in a horizontal plane, a tip mounted aerodynamic pod secured to the blade for movement therewith, a gas turbine unit mounted within said pod and having upper and lower compressor and turbine rotors provided with a common power shaft at spaced apart locations thereon, said unit having an exhaust stack discharging in a transverse plane through a vertically offset girth opening in the pod and in a direction slightly downwardly and rearwardly so as to produce a translatory thrust having a blade twisting moment of a predetermined average magnitude, said power shaft having a direction of rotation opposite to said one angular direction with the axis thereof inclining forwardly in the longitudinal vertical plane of the pod at an acute angle greater than approximately 4° from the vertical and producing a gyroscopic blade twisting moment of precession of an opposite average magnitude.

10. An aircraft propulsion mechanism comprising a propelling blade serving as a load sustaining member and rotatable in one angular direction in a horizontal plane, a tip mounted aerodynamic pod secured to the blade for movement therewith, a gas turbine unit mounted within said pod and having vertically spaced apart compressor and turbine rotors provided with a common power shaft, said compressor rotor consisting generally of separate axial flow and radial flow wheels and said turbine having an exhaust stack discharging in a transverse plane through a downwardly offset belly opening in the pod and in a direction slightly downwardly and rearwardly so as to produce a translatory thrust having a blade twisting moment of a predetermined average magnitude, said power shaft having a direction of rotation opposite to said one angular direction with the axis thereof inclining forwardly in the longitudinal vertical plane of the pod at an angle less than approximately 19° from the vertical and producing a gyroscopic blade twisting moment of precession of an opposite average magnitude.

11. An aircraft propulsion mechanism comprising a propelling blade serving as a load sustaining element and rotatable in a horizontal plane, a tip mounted aerodynamic pod rigid with the blade for movement therewith and having front and rear portions in substantial alignment in their paths of motion with respect to one another, a gas turbine engine mounted between said portions internally of said pod and having vertically spaced apart compressor and turbine members provided with a common power shaft, said compressor and turbine members being further provided with a generally U shaped motive fluid conduit effective to interconnect the same and having a burner containing base portion between the opposite leg portions thereof, each of said leg portions being tangentially connected to a different one of said members to define a fluid flow path between the same and the burner containing base portion and said base portion being disposed in said horizontal plane and defining a fluid flow path transversely of the alignment of the pod portions and in the direction of the load sustaining element.

12. An aircraft propulsion mechanism for a propelling blade serving as a load sustaining element and rotatable in one angular direction in a horizontal plane, said propulsion mechanism comprising a tip mounted power plant including an aerodynamic pod carried by the blade for movement therewith and having front inlet and rear portions in substantial alignment in their paths of motion with respect to one another and having a downwardly offset belly opening, a gas turbine mounted between said portions within the pod and having vertically spaced apart compressor and turbine members provided with a generally U-shaped motive fluid conduit effective to interconnect the same and having a burner containing base portion between the opposite leg portions thereof, each of said leg portions being tangentially connected to a different one of said members to define a fluid flow path between the same and the burner containing base portion and said base portion being disposed in said horizontal plane but transversely to the two said pod portions and defining a fluid flow path in the direction of the load sustaining element, and an exhaust conduit connected to the turbine member and having a jet outlet nozzle discharging generally in the plane of the downwardly offset belly opening but disposed in downwardly eccentric relationship with the latter so as to define therewith an included gap for interposing a portion of the air from the front inlet in a break-away stream between the jet discharge and the belly of the pod, there being a power shaft common to the vertically spaced apart turbine and compressor members and inclined at an acute angle from the vertical in the longitudinal plane of the power plant so as to provide a gyroscopic couple of precession tending to oppose the unbalance moment of the eccentrically located downwardly offset jet discharge.

13. In an aircraft propulsion mechanism having a propelling blade serving as a load sustaining element and rotatable in one angular direction in a horizontal plane, means for driving the propelling blade comprising a tip mounted aerodynamic pod carried thereby for movement therewith and defining front inlet and belly discharge openings disposed out of alignment in their paths of motion with respect to one another such that the belly opening is relatively downwardly offset, a self-energized engine mounted behind and in communication with the front inlet opening within said pod and having vertically spaced apart compressor and turbine members, said compressor and turbine members being provided with a generally U-shaped motive fluid conduit effective to interconnect the same and having a burner containing base portion between the opposite leg portions thereof, each of said leg portions being tangentially connected to a different one of said members to define a fluid flow path between the same and the burner containing base portion and said base portion being disposed in said horizontal plane transverse to said front inlet openings and defining a fluid flow path in the direction of the load sustaining element, and an exhaust conduit connected to the turbine member and having a jet outlet nozzle discharging generally in the plane of the downwardly offset belly opening but disposed in a downwardly eccentric relationship within the latter so as to define therewith an included gap for interposing a portion of the air from the front inlet in a break-away stream between the jet discharge and the belly of the pod, there being a power shaft common to the vertically spaced apart turbine and compressor members and inclined at an acute angle from the vertical in the longitudinal plane of the power plant so as to provide a gyroscopic couple of precession tending to oppose the unbalance moment of the eccentrically located downwardly offset jet discharge.

14. A tip engine for driving a propelling blade serving as a load sustaining element and rotatable in a horizontal plane, said tip engine comprising an aerodynamic pod having means for attaching the same to the blade for movement therewith and defining front inlet and rear openings in a substantial alignment in their paths of motion with respect to one another and having a downwardly offset belly opening, mechanism mounted between said openings within said pod comprising vertically spaced apart compressor and turbine members, said compressor and turbine members being provided with a motive fluid conduit effective to interconnect the same and having a burner containing mid-portion between the opposite end portions thereof, each of said end portions being tangentially connected to a different one of said members to define a fluid flow path between the same and the burner containing mid-portion and said mid-portion being disposed in said horizontal plane transversely to the two said front and rear openings and defining a fluid flow path in the direction of the load sustaining element, and an exhaust conduit connected to the turbine member and having a jet outlet nozzle discharging generally in the plane of the downwardly offset belly opening but disposed in downwardly eccentric relationship within the latter so as to define therewith an included gap for interposing a portion of the air from the front inlet in a break-away stream between the jet discharge and the belly of the pod, there being a power shaft common to the vertically spaced apart turbine and compressor members and inclined at an acute angle from the vertical in the longitudinal plane of the power plant so as to provide a gyroscopic couple of precession tending to oppose the unbalance moment of the eccentrically located downwardly offset jet discharge.

15. An aircraft propulsion mechanism comprising a propelling blade serving as a load sustaining element and rotatable in a horizontal plane, a tip mounted aerodynamic pod secured to the blade for movement therewith and having front and rear portions in substantial alignment in their paths of motion with respect to one another, a gas turbine unit mounted within said pod between the portions aforesaid in communication with an inlet opening in the front portion, said gas turbine unit having vertically spaced apart compressor and turbine members provided with a common power shaft and further provided with separate U shaped motive fluid conduits effective to interconnect the same, one of said conduits serving as a compressed air conducting stator cooling conduit and the other having a burner containing base portion between the opposite leg portions thereof, each of the leg portions of said other U shaped conduit being tangentially connected to a different one of said members to define a fluid flow path communicating with the burner path and said burner containing base portion being disposed in said horizontal plane transverse to the two said pod portions and defining a burner path of flow in the axial direction of and toward said load sustaining element.

16. A tip engine for driving a propelling blade serving as a load sustaining element and rotatable in one angular direction in a horizontal plane, said engine comprising an aerodynamic pod having means for securing the same to the blade for movement therewith and having front and rear portions in substantial alignment in their paths of motion with respect to one another and a downwardly offset belly opening, mechanism mounted between said portions within said pod including compressor and turbine members provided with separate U shaped motive fluid conduits effective to interconnect the same, one of said conduits serving as a compressed air conducting stator cooling conduit and the other having a burner containing a base portion between the opposite leg portions thereof, each of the leg portions of said other U shaped conduit being tangentially connected to a different one of said members to define a fluid flow path communicating with the burner path and said burner containing base portion being disposed in said horizontal plane transverse to the two said openings and defining a burner path of flow leading in the direction of said load sustaining element, and an exhaust conduit connected to the turbine member and having a jet outlet nozzle discharging generally in the plane of the downwardly offset belly opening but disposed in downwardly eccentric relationship within the latter so as to define therewith an included gap for interposing a portion of the air from the front inlet in a break-away stream between the jet discharge and the belly of the pod, there being a power shaft common to the vertically spaced apart turbine and compressor members and inclined at an acute angle from the vertical in the longitudinal plane of the power plant so as to provide a gyroscopic couple of precession tending to oppose the unbalance moment of the eccentrically located downwardly offset jet discharge.

17. An aircraft propulsion mechanism comprising a propelling blade rotatable in one angular direction, an aerodynamic pod carried by said propelling blade and having front and rear aligned openings therein, a gas turbine unit mounted between said openings within said pod, said gas turbine unit comprising a power shaft having an axis inclined forwardly in the longitudinal vertical plane of the pod, at an angle lying between 4° and 19°, a compressor rotor carried by said shaft, and a turbine rotor carried by said shaft in spaced relation with said compressor rotor whereby said gas turbine unit rotates in an angular direction opposite to the angular direction of the blade so as to produce a gyroscopic blade twisting couple of precession of negative moment.

References Cited in the file of this patent

UNITED STATES PATENTS

| | | |
|---|---|---|
| 2,216,731 | Birmann | Oct. 8, 1940 |
| 2,474,359 | Isacco | June 28, 1949 |
| 2,580,207 | Whittle | Dec. 25, 1951 |
| 2,601,463 | Stanley | June 24, 1952 |